Dec. 23, 1941.  E. W. MILLER ET AL  2,266,889
CUTTER RELIEVING MEANS FOR SHAPING MACHINES
Filed Oct. 16, 1939  2 Sheets-Sheet 1

Inventors
Edward W. Miller
Everard Stubbs
by Wright, Brown, Quinby & May
Attys.

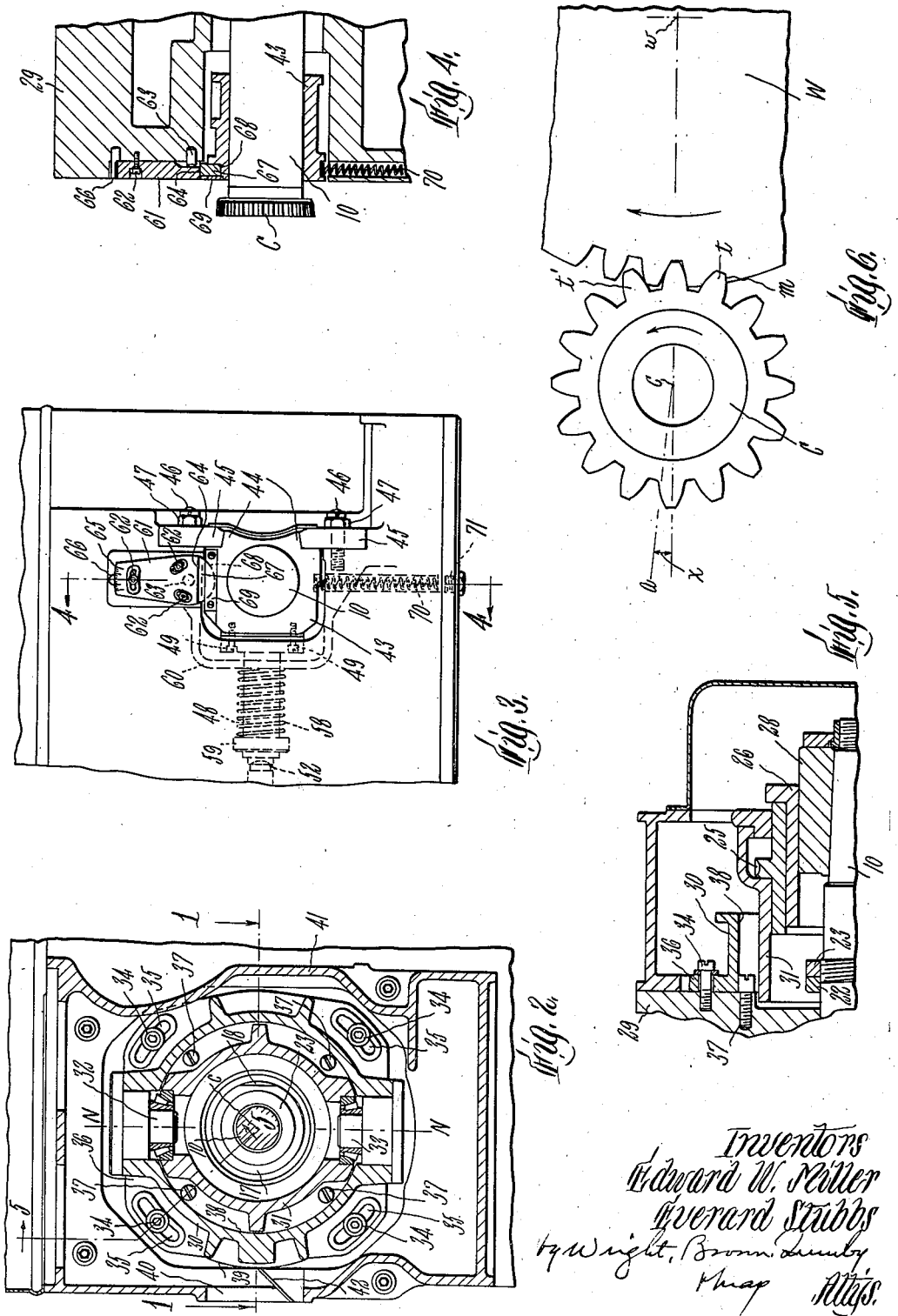

Patented Dec. 23, 1941

2,266,889

UNITED STATES PATENT OFFICE 2,266,889

CUTTER RELIEVING MEANS FOR SHAPING MACHINES

Edward W. Miller and Everard Stubbs, Springfield, Vt., assignors to The Fellows Gear Shaper Company, Springfield, Vt., a corporation of Vermont Application October 16, 1939, Serial No. 299,620

16 Claims. (Cl. 90—7)

This invention relates to machines of the type in which cutting is performed by a relative reciprocating movement between a cutting tool and a work piece, where the cutting action is effected during movement in one direction and a separation is produced between the tool and work during movement in the opposite direction to prevent rubbing of the tool on the work at such times. It is more particularly concerned with shaping machines, such as those for cutting gears and similar articles by means of a gear-like planing cutter, where the tool cuts grooves in the work piece and also generates curves of a prescribed form on the sides of the grooves in consequence of a generative rotation of the cutter and work piece about their respective axes, and where certain teeth of the cutter are more or less embraced by the uncut material of the work piece so that the displacement of the cutter for relief must take place in a narrowly limited direction in order to clear the work at all points when the return or non-cutting traverse takes place. The object of the invention is to furnish a means by which the direction of such relief movement may be exactly determined, and may be altered as needed to suit different conditions.

We have herein illustrated an embodiment of the invention in connection with a gear shaping machine of the Fellows type where reciprocating and relief movements are given to a spindle which carries the cutter, and the cutter spindle and work spindle are rotated about different axes, one of which coincides with the path of reciprocation of the cutter spindle. This showing, however, is not to be construed as a limitation of the invention to that specific embodiment. In its broader aspects the invention consists in a means for adjusting the angle of relieving motion or back-off between cutter and work in a shaping machine. More specifically it consists in the principles of the means for effecting such relief movement disclosed in the following specification, and the details thereof, together with combinations of such principles and means with cooperating parts of the machine, and all equivalents of the particulars herein disclosed.

In the drawings,

Fig. 2 is a cross section on line 2—2 of Fig. 1;

Fig. 3 is an elevation of the parts at the right of line 3—3 in Fig. 1 as viewed from the direction of the arrows applied thereto;

Fig. 4 is a detail section on line 4—4 of Fig. 3;

Fig. 5 is a partial section taken on line 5—5 of Fig. 2;

Fig. 6 is a detail view of a gear shaper cutter in the course of generating teeth in a gear blank, to illustrate the purpose and utility of the invention.

Like reference characters designate the same parts wherever they occur in all the figures.

Figure 1:
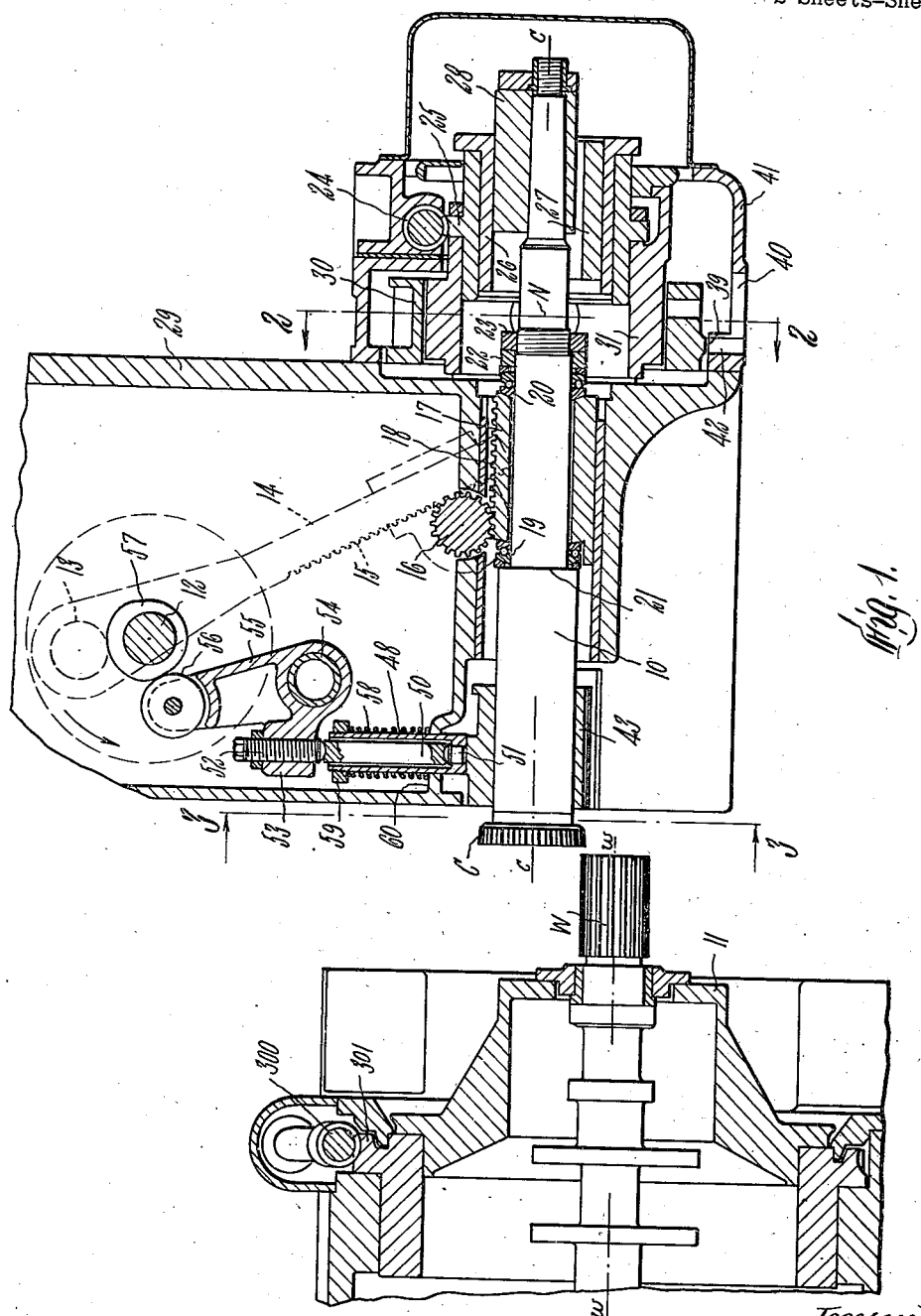
Fig. 1 is a section through the axes of the cutter and work spindles of a gear shaping machine, showing so much of the associated parts of the machine as necessary for explanation of the present invention. The plane of this section is indicated by the line 1—1 in Figs. 2 and 3.

Referring first to Fig. 6, C represents a gear shaper cutter and W represents a gear blank in which teeth are in course of being generated and cut in accordance with the well known Fellows gear shaping process. Generation of correct tooth form in the work is assured by simultaneous rotation of the cutter about its center $c$ and the work about its center $w$ at angular speeds inversely proportional to the number of teeth of the cutter and the number of teeth to be cut in the work. When the teeth of the cutter first enter the work piece, they are more or less closely embraced by the uncut substance of the gear blank. As they travel toward the point of separation, they deepen and widen the slots or tooth spaces being cut. Assuming that the cutter and gear blank here shown are rotated in the direction of the arrows, the cutter tooth $t$ is such an entering tooth, which has partially entered the gear blank and the tooth $t'$ is on the point of leaving the work. The material at the part $m$ of the work piece makes extended and more or less overlapping contact with the side of the tooth $t$, wherefore the relieving movement of the cutter (assuming that it is the cutter rather than the work piece which is displaced for relief) is caused to take place in a direction, indicated by the line $c-a$, which makes an angle $x$ with the line of centers $c-w$. The value of the angle $x$ is determined by the direction in which the tooth $t$ must be displaced to clear fully the adjacent material $m$, but must not be so large as to cause interference of the relatively opposite side of any other tooth with the material of the work piece. Different conditions (as of pitch and pressure angle of the cutter teeth; diameter of the gear blank, etc.; generation of internal gears instead of external gears; reversal of the direction of rotation; etc.) in a machine designed for doing a wide variety of work, require the angle $x$ to be varied in degree, and may require it to be shifted from one side to the other of the line of centers. In some cases the angle may be zero, while in others it may have appreciable magnitude. The central feature of our present invention is provision for changing the value of the angle $x$.

We have here illustrated an embodiment of such means in connection with a gear shaping machine in which the cutter spindle and work spindle are horizontal with their axes parallel. A cutter spindle 10, which is both movable endwise and rotatable about its axis $c$—$c$ carries the cutter C, and a work spindle 11, rotatable about its axis $w$—$w$, carries the work piece W. The latter may be a gear blank of any character secured to the work spindle by any suitable clamping or other holding means.

Reciprocating motion is imparted to the cutter spindle from a main shaft 12 by a crank 13 secured to the shaft, a connecting rod 14 coupled to the crank and having rack teeth 15 on one side, a gear 16 in mesh with the rack teeth 15 and a sleeve 17 surrounding the spindle and having rack teeth 18 with which the pinion 16 meshes. Either a single pinion or two pinions connected together coaxially may mesh with the teeth 15 and 18 respectively. End thrust bearings 19 and 20 transmit endwise movement from the sleeve 17 to the spindle; in one direction by means of a shoulder 21 on the spindle and in the opposite direction through a washer 22 and nut 23 secured to the spindle. The internal diameter of sleeve 17 is larger than the external diameter of that part of the spindle which passes through it, to permit lateral movement of the spindle for relieving purposes, as later described.

Generative rotation is imparted to the spindle from a worm 24 meshing with a worm wheel 25, within which is secured a sleeve 26 having a guide 27 which engages a guide 28 secured to the spindle; said guides having abutting surfaces which transmit rotation to the spindle while permitting independent endwise reciprocative movement of the latter. All of the parts described are mounted in a saddle or carriage 29 supported on a framework of any suitable character with provision for movement such as to alter the distance of the axis $c$—$c$ from the axis $w$—$w$ and to place it at either side of the latter axis.

The work spindle 11 is driven rotatably at a speed and in a direction harmonious with the rotation of the cutter, by means of a worm 300 meshing with a worm wheel 301 which forms an operative part of the work spindle; the relative rotational speeds of worms 300 and 24 being correlated by suitable change gears.

All these driving means and the necessary provisions for mounting and shifting the carriage 29 as well, may be like or similar to those shown in the patent of Edward W. Miller 2,126,339, August 9, 1938, to which reference is directed for a full description.

The cutter relieving means, in which the novel features of the invention are embodied consists of the following. A massive ring 30 is secured to the carriage structure 29 to surround concentrically the bearing sleeve 31 in which the hub of the worm wheel 25 is mounted adjacent to the outer end of the cutter spindle. This ring supports trunnions 32 and 33 alined on an axis N—N perpendicular to the spindle axis $c$—$c$, and the bearing sleeve 31 is mounted on these trunnions so as to swing about the axis N—N. The ring 30 is so mounted that the axis N—N may be located either perpendicular to the plane established by the spindle axes $c$—$c$ and $w$—$w$ or at any angle within limits to said perpendicular position. It is clamped to the carriage structure by bolts 34 passing through slots 35 in a flange 36, which forms part of the structure of the ring, and received in tapped holes in the carriage structure. Studs 37 mounted in the adjacent structure of the carriage are engaged by the inner surface 38 of the ring and serve to center the latter. They are accurately located at proper distances from the spindle axis and the surface 38 is accurately made with cylindrical arcs coaxial with the same axis whereby to maintain the intersection of the axes $c$—$c$ and N—N at the same point during and after adjustment of the ring, without depending on the clamping bolts 34 and slots 35 for the centering function.

An external coaxial surface 39 on the ring 30 is visible through window 40 in the side of the housing 41 and carries a scale of angular degrees (or equivalent graduations) cooperating with a pointer 42 to show the position of the ring. With the aid of such pointer and graduations the operator is enabled to set the trunnions so as to permit relief movement of the cutter at any desired angle to the plane of the cutter and work spindle axes. Housing 41 is secured to the carriage 29 and supports bearings for the worm 24 while enclosing the worm wheel 25, ring 30, and associated parts.

The inner end of the spindle 10, that on the extremity of which the cutter C is mounted, is fitted, with a close sliding fit, in a guide bushing 43. One side of the bushing is formed with shoulders 44 fitting between abutment blocks 45 which are secured to the interior frame structure of the cutter carriage by bolts 46 and nuts 47. The abutting faces of the shoulders 44 and blocks 45 are located at opposite sides of the plane of the axes $c$—$c$ and $w$—$w$, preferably equidistant from such plane, at the side of the spindle 10 toward which the spindle is moved for placement in the cutting path, after having been displaced for relief; and they are tapered convergently in the same direction. The blocks 45 are adjustable to vary the distance between their contact faces, whereby to arrest the shoulders 44 (and bushing 43) when the spindle has been placed in the exact location predetermined as its cutting path. The tapered or convergent disposition of said abutting surfaces not only centers the cutter spindle axis accurately in the prescribed plane with respect to the work spindle, but also permits withdrawal of the cutter spindle at different angles to said prescribed plane, within the limits of the angle of taper; and enables the location and inclination of the cutting path with respect to the work spindle axis to be varied by changing the distance between the abutments.

A rigid tubular arm 48 is secured to the side of bushing 43 opposite to the shoulders 44 by means of bolts 49 passing through flanges at the base of the arm into the bushing. A transmission rod 50 is contained loosely in the interior bore of arm 48 and bears at its inner end against the head of a stud 51 which is set into the structure of the arm at the base of the bore. The outer end of rod 50 is engaged by an adjustable stud 52 threaded through one arm 53 of a bell crank lever which is mounted on a fixed pivot 54 in the carriage structure. The other arm 55 of said bell crank lever carries a roll 56 bearing on a cam 57, which we call the spindle relieving cam, mounted on the main shaft 12. A helical spring 58 surrounds the tubular arm 48 and is held under compression between a collar 59 on the arm and an abutting surface 60 on a portion of the carriage structure. Arm 48 extends, and is movable endwise freely, through an opening in the structure 60, but is constrained from lateral movement by the boundaries of such opening and thereby prevents the bushing 43 from being carried endwise by endwise movement of the spindle when the bushing is clear of the abutment blocks 45.

It will be plain that the high portion of the relieving cam 57, acting through lever 53—55 and transmission rod 50, serves to bring the shoulders 44 into contact with the abutment blocks 45 and to exert a pressure (adjustable by screw stud 52) sufficient to hold the bushing rigidly in position. Spring 58 tends constantly to withdraw the bushing from the abutment blocks and does so withdraw it when permitted by the cam, holding the follower roll 56 against the relieving cam. In the organization here represented, the cam has one high dwell and one low dwell, each extending through nearly half the circumferenece of the cam, joined by a short rise and a short descent at opposite sides of the center. The cam rotates in unison with the crank shaft 12 and is so located as to shift the spindle into its cutting path prior to the commencement of each cutting stroke and permit relieving withdrawal of the cutter spindle at the end of each cutting stroke. The movement thus given to the spindle is sufficient to shift the cutter clear of the work, but in actual dimensions is too small to be shown accurately on a drawing of such small scale as that accompanying this specification. Hence the difference between the high and low parts of the cam has been shown with exaggeration in this drawing.

In its withdrawal for relief and return prior to cutting strokes of the spindle, bushing 43 is guided by an angle block 61 at one of the sides of the bushing intermediate the shoulders 44 and arm 48. Angle block 61 is set into a recess in the face of the cutter carriage 29 adjacent to the bushing and is clamped against the bottom of the recess by bolts (preferably three or more in number) 62. It is angularly adjustable about a fixed stud 63 which is set in the carriage structure and enters a recess in the rear face of the block. The clamping bolts 62 pass through arcuate slots in the block, concentric with stud 63, which have sufficient lengths to permit adjustment within the prescribed limits. The end of the block next to the bushing 43 is provided with a plane surface 64 which may be set parallel to the plane established by the spindle axes c—c and w—w when the cutter spindle is in working position, or at different angles, represented by the angle x in Fig. 6, to said plane. A scale of angular degrees 65 on the exposed face of the block 61 adjacent to its outer end, and a fixed pointer 66 show the setting of the face 64 and guide the machine operator in setting said face to any desired value of the angle x.

A complemental surface to cooperate with the guiding face 64 of angle block 61 is provided by a follower block 67 made as a segment of a cylinder having a plane chordal face to bear against the guide face 64 and a cylindrical face 68 which fits a complemental recess in the bushing. Said cylindrical face 68 and complemental recess are concentric with the pivot 63 when the bushing is in one of its positions, preferably the position of forcible engagement with the abutment blocks 45. Hence when guide or angle block 61 is adjusted around the pivot 63, the follower block 67 is correspondingly shifted and its contact surface brought to the same inclination as the guiding surface 64. As a convenient detail of construction, the outer wall of the recess in the bushing which contains the follower block 67 is formed by a removable plate 69 bolted to the end of the bushing.

A helical spring 70 is contained in a passageway through a part of the carriage structure at the opposite side of the bushing 43 from the angle guide block 61. This spring bears at one end against the bushing and reacts against an abutment screw 71 set into the carriage structure and by which the spring is compressed. The spring therefore holds the follower block in contact with the guiding surface 64 when the bushing is clear of the abutment blocks 45 and causes the bushing to move in the path prescribed by the said guiding surface in relieving the cutter and in returning to the working path.

It is inherent in the description and drawings that the guiding face 64 lies in a plane perpendicular to the pivot axis N—N when adjusted parallel to the common plane of the cutter and work spindle axes and when the pivot axis N—N is perpendicular to that plane. When the axis N—N is shifted to any given angle from said perpendicular position and the face 64 is shifted to an equal angle of the same hand from said parallel position, the spindle is permitted and constrained to move at the same angle to the line of centers in being relieved from the work and returned to the cutting path. Hence the graduations 65 on the block 61 and those on the face 39 of ring 30 enable the operator to adjust the relieving means quickly and accurately to relieve the cutter in any direction prescribed by its characteristics and the character of the gear to be cut. A more exact determination and maintenance of the path of relief is made possible with the aid of the guiding face 64 than by the trunnions 32 and 33 alone or any means heretofore used.

Although we have described the application of our relieving means to the cutter spindle of a gear shaping machine, we wish to make it understood that it is not restricted to use with this type of machine only or to the cutter spindle as distinguished from the work spindle of a machine, or to a reciprocating spindle (whether rotatory or not) rather than a spindle which is stationary except for such relief movement. The principles of our adjustable relieving means may be combined with the tool holding or work holding means of various machines in a wide variety of embodiments and combinations. Wherever provision exists for swinging lateral movement of a tool or work holder and for adjustment and guiding of the direction of such swinging movement, there our invention may be applied.

For the purpose of generic definition in the claims, the cutter spindle 10 and work spindle 11 are considered as holders for the tool and work piece respectively. One of such holders (in this case the cutter spindle 10) is movable back and forth in a given path, (i. e., lengthwise of the spindle), to effect relative cutting traverse and return movements between the tool and work piece. The ring 30, which carries the pivot trunnions for permitting relief movement of the cutter, is considered as a pivot mounting between which and one of the above defined holders there is a pivotal connection on an axis transverse to the path in which the movable holder is reciprocated and perpendicular to the predetermined direction of relief separation. Adjustment of the pivot mounting 30 to alter the direction of relief separation is generically defined as taking place about an axis extending in the same general direction as the path of cutting and return movements of the endwise movable holder. This generic definition applies to the specific embodiment here illustrated since the axis of angular adjustment of the ring 30 coincides with the axis of the work spindle, which extends in the middle of the path of reciprocating movement of that spindle.

The face 64 of the angle block 61 is a guide for that holder which is pivotally connected to the pivot mounting. Such guide extends in the predetermined direction of relief separation between the tool and work piece and is angularly adjustable to fix such direction as predetermined. The axis of its angular adjustment (determined by the pivot pin 63) is parallel to the axis around which the pivot mounting 30 is adjusted.

What we claim and desire to secure by Letters Patent is:

1. In a machine tool having a tool holder and a work holder, one of which holders is movable back and forth in a given path to effect relative cutting and return movements, a means for causing separation between the tool and work piece during the return movements and for varying the direction of such separation, comprising a pivot mounting having a pivotal connection with one of said holders at a distance from the working locations of tool and work piece, the axis of such pivotal connection being transverse to the path of said cutting and return movements and said mounting being adjustable angularly about an axis extending in the same general direction as said path, and mechanism acting on said pivoted holder to swing it about said axis in opposite directions in timed correlation with the said cutting and return movements.

2. In a machine tool having a reciprocatory cutter holder, a work holder, and means for reciprocating the cutter holder to perform alternate cutting and return strokes, a means for producing separation between the cutter and a work piece to avoid rubbing contact during the return strokes of the cutter holder comprising a mounting with which one of said holders is in pivotal connection at a distance from the working range of the cutter, with the axis of said pivotal connection transverse to the path of movement of said reciprocatory holder and also to the predetermined direction of such relief separation, said mounting being adjustable angularly in a manner to alter the direction of relief separation, and mechanism in timed relation to the cutter holder reciprocating means for swinging said pivoted holder in the direction to cause such separation at the end of the cutting strokes and in the opposite direction at the end of the return strokes.

3. In a shaping machine having a tool holder and a work holder, one of which is reciprocatory for effecting cutting traverse and return movement between a tool and a work piece, means supporting one of said holders with capacity for movement transversely of the path of said reciprocatory holder for effecting relief of the tool and work piece, one from the other, during the return movements of said reciprocatory holder, means for shifting said transversely movable holder alternately in the relieving direction and in the opposite direction, and guide means engaged with said shiftable holder and arranged with respect thereto for confining the relief and return movements of said shiftable holder to a predetermined path, said guide means being displaceable in a manner to alter the location of such path.

4. In a shaping machine having a tool holder and a work holder, one of which is reciprocatory for effecting cutting traverse and return movement between a tool and work piece, means supporting one of said holders with capacity for movement transversely of the path of said reciprocatory holder for effecting relief of the tool and work piece, one from the other, during the return movements of said reciprocatory holder, means for shifting said transversely movable holder alternately in the relieving direction and in the opposite direction, and a guide extending in the direction of relief movement engaged with said shiftable holder, and with respect to which the holder is relatively movable in the relieving direction, for causing its movements of relief and return to take place in a predetermined path, said guide being angularly adjustable to shift the direction of said path.

5. In a gear shaping machine, a cutter spindle, a gear shaper cutter carried by said spindle, a work spindle, one of said spindles being reciprocatory endwise to effect relative cutting traverse and return movements between said cutter and a work piece, one of said spindles being pivotally mounted at a distance from the zone of action of the cutter to swing about an axis transverse to the path of reciprocation of the reciprocatory spindle, means for adjusting the said axis in a plane transverse to said path whereby to vary the direction of said swinging movement, and means for shifting the swingable spindle through a distance sufficient to effect relief between the cutter and work piece and to restore the cutter and work piece to their cutting relationship.

6. In a gear shaping machine having a cutter spindle, a gear shaper cutter secured to said spindle, a work spindle adapted to hold a gear blank, one of said spindles being reciprocatory endwise, means for reciprocating said spindle to effect relative cutting and return strokes between the cutter and work piece, a pivot mounting pivotally connected with one of said spindles at a distance from the cutter and on an axis transverse to the path of the reciprocatory spindle, to permit relief separation between the cutter and work piece, said pivot mounting being angularly adjustable to cause the relief movement to occur in any predetermined direction within a given range, and a guide engaging said pivotally mounted spindle and having a guiding surface in a plane substantially perpendicular to said axis, said guide being angularly adjustable to set its guiding surface in different planes respectively perpendicular to different positions of the axis.

7. In a shaping machine having a work holder and a cutter holder, one of which is reciprocatory to effect relative cutting and return strokes between a cutter mounted on the cutter holder and a work piece mounted on the work holder, one of said holders being movable transversely to the path of reciprocation of said reciprocatory holder to permit relieving separation between the cutter and work piece during return strokes and to place them in cutting relationship during the cutting strokes, said transversely movable holder having shoulders with convergent external faces and the machine having fixed abutments for engagement with said convergent faces to locate the transversely movable holder in an exact position during the cutting strokes; means for moving the last named holder to withdraw said shoulders from said abutments and return the shoulders into contact with the abutments, and a guide at one side of the transversely movable holder for causing its said transverse movements to take place in a predetermined path.

8. In a shaping machine having a work holder and a cutter holder, one of which is reciprocatory to effect relative cutting and return strokes between a cutter mounted on the cutter holder and a work piece mounted on the work holder, one of said holders being movable transversely to the path of reciprocation of said reciprocatory holder to permit relieving separation between the cutter and work piece during return strokes and to place them in cutting relationship during the cutting strokes, said transversely movable holder having shoulders with convergent external faces and the machine having fixed abutments for engagement with said convergent faces to locate the transversely movable holder in an exact position during the cutting strokes, means for moving the last named holder to withdraw said shoulders from said abutments and return the shoulders into contact with the abutments, and a guide at one side of the transversely movable holder for causing its said transverse movements to take place in a predetermined path, said guide being angularly adjustable to vary and determine the direction of such transverse movement.

9. In a gear shaping machine, an endwise movable and rotatable spindle, a rotatable gear element surrounding said spindle, guide means between said gear element and spindle constructed to transmit rotation and permit endwise movement of the spindle relatively to the gear element, a bearing for the gear element, a pivot mounting surrounding said bearing having pivot trunnions alined on a diameter of said bearing with which the bearing is engaged to permit swinging movement of the spindle transverse to its length, mechanism for reciprocating the spindle, and associated mechanism for swinging it about the axis of said trunnions in correlated timing with the reciprocating movements of the spindle, said pivot mounting being angularly adjustable about the axis of the spindle to vary and control the direction of said swinging movement.

10. In a gear shaping machine, an endwise movable and rotatable cutter spindle adapted to carry a gear shaper cutter, means for transmitting rotation to said spindle while permitting its endwise movement, a pivot mounting pivotally connected to said spindle at a distance from the cutter location on an axis transverse to the axis of the spindle, a bushing surrounding the spindle near the cutter location having shoulders with convergent faces at one side of the diametral plane containing said pivot axis, fixed abutments arranged to engage said convergent shoulders for locating the bushing in a prescribed position, an arm projecting from the bushing at the opposite side thereof from the said shoulders and abutments, means acting on said arm for moving the bushing into and out of engagement with the abutments, and a guide engaging an intermediate side of the abutment for controlling the directions of the movements thus given to the bushing.

11. In a gear shaping machine, an endwise movable and rotatable cutter spindle adapted to carry a gear shaper cutter, means for transmitting rotation to said spindle while permitting its endwise movement, a pivot mounting pivotally connected to said spindle at a distance from the cutter location on an axis transverse to the axis of the spindle, a bushing surrounding the spindle near the cutter location having shoulders with convergent faces at one side of the diametral plane containing said pivot axis, fixed abutments arranged to engage said convergent shoulders for locating the bushing in a prescribed position, an arm projecting from the bushing at the opposite side thereof from the said shoulders and abutments, means acting on said arm for moving the bushing into and out of engagement with the abutments, and a guide engaging an intermediate side of the abutment for controlling the directions of the movements thus given to the bushing, said pivot mounting and guide being angularly adjustable in correlation with one another to vary the direction of said movements of the bushing.

12. In a machine tool having cutter and work holders, one of which is movable in a given path to effect cutting and return strokes, and one of which is movable transversely of such path to effect relief between the cutter and work piece, and return thereof to cutting relationship, a guide for controlling the direction of such relief and return movements consisting of a stationary angularly adjustable block having a contact face, and a follower block having a complemental face in contact with the first named face, and a bounding surface which is coaxial with the axis of angular adjustment of the first named block, one of said blocks being mounted on the supporting structure of the machine and the other being mounted on said transversely movable holder, the coaxial bounding surface of the follower block enabling it to be self adjusting to angular adjustments of the guide block.

13. In a shaping machine having a supporting structure and a spindle mounted with provision for movement transversely of its length, a bushing surrounding said spindle, a guide block mounted on the supporting structure at one side of said bushing having a guiding face next to the bushing and being adjustable angularly about an axis substantially parallel to the length dimension of the spindle, and a follower block having a bounding surface concentric with the pivot axis of the guide block seated in a complemental recess in the side of the bushing and having a contact face engaging the guide face of the guide block.

14. In a shaping machine, a spindle movable back and forth endwise, guide means engaging said spindle adjacent to its opposite ends for controlling its path of movement, one of said guide means being shiftable transversely to said path and the other guide means being pivotally mounted to permit such shifting, the transversely shiftable guide means having separated contact faces inclined at relatively opposite inclinations to the direction of such shifting movements, and stationary abutments having contact faces separated from one another widely enough to permit entrance between and contact with them of the first named contact faces.

15. In a shaping machine a spindle movable back and forth endwise, guide means engaging said spindle adjacent to its opposite ends for controlling its path of movement, one of said guide means being shiftable transversely to said path and the other guide means being pivotably mounted to permit such shifting, the transversely shiftable guide means having separated contact faces inclined at relatively opposite inclinations to the direction of such shifting movements, and stationary abutments having contact faces separated from one another widely enough to permit entrance between and contact with them of the first named contact faces, said abutments being adjustable to vary the width of the space between their contact faces whereby to control and determine the location of said transversely shiftable guide means when in contact with the abutments.

16. In a machine tool having a tool holder and a work holder, one of which holders is movable back and forth in a given path to effect relative cutting traverse and return movements, means for causing separation between the tool and work piece during such return movements, comprising a mounting having pivotal connection with one of said holders at a distance from the working locations of tool and work piece on an axis transverse to the path of said cutting and return movements and perpendicular to the predetermined direction of separation, a guide in cooperating relation with said holder at a distance from said pivot axis extending in said predetermined direction for controlling the path of the pivoted holder in the course of such separations, both said pivot mounting and guide being adjustable angularly in a manner to alter the direction in which the separation between the tool and work piece is constrained to take place, and means for swinging the pivoted holder back and forth in the directions constrained by said guide and in timed correlation with said cutting traverse and return movements.

EDWARD W. MILLER.
EVERARD STUBBS.